United States Patent [19]

Ishii et al.

[11] Patent Number: 5,225,497
[45] Date of Patent: Jul. 6, 1993

[54] PROCESS FOR CONTINUOUS PRODUCTION OF ELASTIC POLYESTERS

[75] Inventors: Hiromitsu Ishii, Nagoya; Shoji Yamamoto, Nara; Yoshiyuki Yamamoto, Suzuka, all of Japan

[73] Assignee: Toray Industries, Inc., Tokyo, Japan

[21] Appl. No.: 640,356

[22] PCT Filed: May 17, 1990

[86] PCT No.: PCT/JP90/00626
§ 371 Date: Jan. 17, 1991
§ 102(e) Date: Jan. 17, 1991

[87] PCT Pub. No.: WO90/14376
PCT Pub. Date: Nov. 29, 1990

[30] Foreign Application Priority Data

| May 17, 1989 | [JP] | Japan | 1-125074 |
| May 17, 1989 | [JP] | Japan | 1-125075 |
| May 17, 1989 | [JP] | Japan | 1-125076 |
| May 17, 1989 | [JP] | Japan | 1-125077 |

[51] Int. Cl.⁵ .............................................. C08G 63/91
[52] U.S. Cl. ........................................ 525/437; 525/53
[58] Field of Search ................................. 525/53, 437

[56] References Cited

U.S. PATENT DOCUMENTS

| 3,254,053 | 5/1966 | Fisher | 528/241 |
| 4,500,686 | 2/1985 | Kobayashi | 525/437 |
| 4,680,345 | 7/1987 | Kobayashi | 525/437 |

*Primary Examiner*—Patricia A. Short
*Attorney, Agent, or Firm*—Birch, Stewart, Kolasch & Birch

[57] ABSTRACT

An elastic polyester is continuously prepared by continuously supplying an aromatic polyester and a lactone compound into an extruder which has (A) a cylinder having a shape of $3 \leq L/D \leq 70$ (where L represents the length of the cylinder and D represents the inner diameter of the cylinder) and (B) at least one screw and wherein (C) the occupancy ratio of the space in the inner volume of the cylinder in the screw-attached state is not larger than 70%, and reacting the aromatic polyester with the lactone compound while performing melting, delivery and kneading in the extruder, according to this process, the reaction time can be shortened, and an elastic polyester can be easily prepared at a high efficiency by simplified apparatus and operations. The obtained elastic polyester has an excellent durability represented by heat resistance and weatherability and has an excellent rubbery elasticity and mechanical properties. Accordingly, this elastic polyester can be widely used for the production of automobile parts, electric and electronic parts, machine parts and the like.

23 Claims, 5 Drawing Sheets

PROCESS FOR CONTINUOUS PRODUCTION OF ELASTIC POLYESTERS

BACKGROUND OF THE INVENTION

Technical Field of the Invention

The present invention relates to a novel process for the preparation of an elastic polyester comprising an aromatic polyester as a hard segment and an aliphatic polyester as a soft segment.

Background Art

A polyester-polyester type block copolymer comprising hard segments composed of an aromatic polyester such as polybutylene terephthalate and soft segments composed of a polylactone is widely used as a thermoplastic elastomer having excellent tensile strength, tear strength, flexural fatigue resistance and heat resistance for the production of automobile parts, electric and electronic parts and machine parts.

This polyester-polyester block copolymer type elastic polyester is prepared by melt-mixing and reacting a crystalline aromatic polyester with a lactone compound in a reaction vessel, and the preparation processes are known from Japanese Examined Patent Publication No. 48-4116, Japanese Examined Patent Publication No. 52-49037, Japanese Unexamined Patent Publication No. 61-281124, Japanese Unexamined Patent Publication No. 61-283619, Japanese Unexamined Patent Publication No. 61-287922, Japanese Unexamined Patent Publication No. 62-20525, Japanese Unexamined Patent Publication No. 62-27425 and Japanese Unexamined Patent Publication No. 62-53336.

The known processes disclosed in these patent publications have problems, however, in that the reaction time is long and since the aromatic polyester constituting hard segments and the polylactone constituting soft segments are partially rendered random by the ester exchange reaction, only an elastic polyester having large variations of the melting point and mechanical strength is obtained.

SUMMARY OF THE INVENTION

It is therefore a primary object of the present invention to solve the above-mentioned problem and provide a process for the continuous preparation of an elastic polyester having a stable quality.

The inventors of the present invention found that this object can be attained by using a specific extruder as the reaction vessel and continuously supplying and reacting an aromatic polyester and a lactone compound therein.

More specifically, in accordance with the present invention, there is provided a process for the continuous preparation of an elastic polyester, which comprises continuously supplying an aromatic polyester and a lactone compound into an extruder which has (A) a cylinder having a shape of $5 \leq L/D \leq 60$ (where L represents the length of the cylinder and D represents the inner diameter of the cylinder) and (B) at least one screw, and wherein (C) the occupancy ratio (V) of the space in the inner volume of the cylinder in the screw-attached state as defined by the following formula is not larger than 70%

$$V(\%) = [Ac - As)/Ac] \times 100$$

wherein As is a volume of the screw in the cylinder and Ac is an inner volume of the cylinder including the screw volume, and reacting the aromatic polyester with the lactone compound while performing melting, delivery and kneading in the extruder, whereby the reaction of the aromatic polyester with the lactone is completed in the extruder and an elastic polyester is continuously prepared.

TABLE OF REFERENCE NUMERALS

1: pellet holder
2: tank
3: metering feeder
4: metering pump
5: supply opening
6: single-screw extruder
7: extrusion orifice
8: cooling water tank
9: cutter
10: kneading unit
11: kneading disc zone
12. screw zone
13: vent opening
14: cylinder
15: screw
16: rotation shaft
17: paddle
18: temperature-adjusting jacket
(A): convex lens-shaped paddle
(B): pseudotriangular paddle

BEST MODE FOR CARRYING OUT THE INVENTION

The aromatic polyester used in the present invention is a polymer containing at least one aromatic group and an ester bond in the main recurring unit. As specific examples, there can be mentioned polyethylene terephthalate, polybutylene terephthalate, poly-1,4-cyclohexylenedimethylene terephthalate, polyethylene-2,6-naphthalate and polybutylene-2,6-naphthalate. Mixtures of two or more of these polyesters and copolyesters prepared by copolymerizing these polyesters with isophthalic acid units, units of aliphatic dicarboxylic acids such as adipic acid, sebacic acid and dodecadionic acid, or p-hydroxybenzoic acid units can also be used. Of these aromatic polyesters, polybutylene terephthalate is especially preferably used in the present invention because this polyester has an excellent crystallinity.

The relative viscosity ($\eta r$) of the aromatic polyester used in the present invention is a value measured at 25° C. with respect to a 0.5% by weight polymer solution in o-chlorophenol as the solvent, and is in the range of from 1.20 to 2.00, preferably from 1.30 to 1.80. If an aromatic polyester having a high polymerization degree, that is, a high relative viscosity, is used, the polymerization degree of the obtained elastic polyester is high and the mechanical strength is improved.

As specific examples of the lactone compound used in the present invention, there can be mentioned $\xi$-caprolactone, enantholactone and caprylolactone, but in view of the reactivity with the aromatic polyester and the elastic characteristics of the obtained elastic polyester, $\xi$-caprolactone is especially preferably used.

The extruder used in the present invention is an extruder characterized in that it has (A) a cylinder having a shape of $3 \leq L/D \leq 70$ (where L represents the length of the cylinder and D represents the inner diameter of the cylinder) and (B) at least one screw, and (C)-the occupancy ratio of the space in the inner volume of the cylinder in the screw-attached state is lower than 70%.

As specific examples of the extruder of this type, there can be mentioned a single-screw extruder, a twin-screw extruder and an extruder marketed under the tradename of "Ko-Kneader) by BUSS, which is characterized in that (a) a screw having many discontinued ridges makes one reciprocating motion in the axial direction during one revolution and (b) a cylinder having, on the inner surface thereof, teeth to be engaged with discontinued ridges of the screw (a) is disposed, or an extruder characterized in that (a) two screws having a plurality of plate-shaped paddles attached on the rotation axis are disposed in parallel to each other, (b) the section of the paddle vertical to the longitudinal direction has a shape selected from a convex lens-like shape, an ellipsoidal shape and a pseudopolygonal shape in which respective vertexes are inscribed with an imaginary circle, and (c) the paddle of one screw is rotated with a slight clearance from the paddle of the other screw and the inner face of the cylinder.

In view of the kneadability of the aromatic polyester with the lactone compound and the residence time, L/D (L represents the length of the cylinder and D represents the inner diameter of the cylinder) of the extruder used in the present invention must be at least 3. Furthermore, in view of the processing precision of the extruder and the operation stability against bending of the screw shaft, L/D must be 70 or smaller. Preferably the relation of $5 \leq L/D \leq 60$, especially $5 \leq L/D \leq 50$, is established.

In the extruder used in the present invention, the occupancy ratio of the space in the inner volume of the cylinder in the screw-attached state must be not larger than 70%, preferably in the range of from 5 to 50%. If this occupancy ratio of the space is larger than 70%, the revolution rate of the screw cannot be increased because of the resistance of the melt in the cylinder, and the kneadability becomes poor.

The manner of arranging the extruder is not particularly critical. For example, the extruder can be arranged so that the screw shaft of the extruder extends in the horizontal direction, or the extruder is arranged so that the screw shaft has a certain angle to the horizontal direction to prevent a short path of the liquid lactone compound. In each case, the object of the present invention can be attained.

In the present invention, the method of the continuous supply of the aromatic polyester and lactone compound is not particularly critical. For example, there can be adopted (1) a method in which the lactone compound and the aromatic polyester in the solid state are simultaneously supplied from the same supply opening, (2) a method in which the lactone compound and the aromatic polyester in the solid state are supplied from different supply openings, (3) a method in which the lactone compound and the aromatic polyester in the melted state are simultaneously supplied from one supply opening, and (4) a method in which the lactone compound and the aromatic polyester in the melted state are supplied from different supply openings.

In the present invention, when the aromatic polyester is reacted with the lactone compound, the cylinder temperature is preferably maintained at 210 to 300° C., especially 215° to 250° C. Furthermore, the time from the point of the supply of the aromatic polyester and lactone compound into the extruder to the point of the extrusion of the elastic polyester (residence time) is preferably 30 seconds to 30 minutes, especially 3 minutes to 20 minutes.

Where the unreacted lactone compound is left in the elastic polyester obtained according to the process of the present invention, the final molded product has a lactone smell. Accordingly, preferably the unreacted lactone compound is continuously removed. As an example of the method of removing the unreacted lactone compound, there can be mentioned a method in which a vent opening is formed at the top end portion of the extruder, and the unreacted lactone compound is continuously removed from the elastic polyester under a reduced pressure not higher than 50 Torr, preferably not higher than 10 Torr.

In the present invention, the ratio of the aromatic polyester and lactone compound supplied into the extruder is preferably from 99/1 to 20/80, especially preferably from 98/2 to 30/70, as the aromatic polyester/lactone compound weight ratio, from the viewpoint of the mechanical properties of the obtained elastic polyester.

To increase the viscosity of the elastic polyester and improve the hydrolysis resistance, a compound having at least one epoxy group in the molecule can be supplied to the extruder together with the aromatic polyester and lactone compound. As specific examples of the compound can be mentioned methyl glycidyl ether, phenyl glycidyl ether, diethylene glycol diglycidyl ether, hydrogenated diglycidyl isophthalate, bisphenol A diglycidyl ether and p-glycidyloxybenzoate glycidyl ether.

Among them, compounds having at least two epoxy groups are preferably used. The epoxy group-containing compound is preferably added in an amount of 0.01 to 0.27% by weight, especially 0.10 to 0.25% by weight, based on the sum of the aromatic polyester and lactone compound. If the amount added is smaller than 0.01% by weight, no substantial effect is attained by the addition, and if the amount added is larger than 0.27% by weight, in case of a certain epoxy group-containing compound, the melt viscosity of the elastic polyester is increased while kept in the molten state, for example, during the molding, and hence, no good molding material can be obtained.

In the process of the present invention in which an elastic polyester is continuously prepared by reacting the aromatic polyester with the lactone compound in an extruder, a catalyst can be added, or the aromatic polyester can be reacted with the lactone compound in the absence of a catalyst. All of known ester exchange catalysts can be used. For example, there can be used metals such as lithium, potassium, sodium, magnesium, calcium, barium, zinc, aluminum, titanium, cobalt, germanium, tin, lead, antimony, cadmium, manganese and zirconium, and organic metal compounds, organic acid salts, alcoholates and alkoxides of these metals. Tin compounds such as stannous diacyl, stannic tetraacyl, monobutyltin oxide, dibutyltin oxide, dibutyltin laurate and tin tetraacetate, and triisobutylaluminum, tetrabutyl titanate, tetrabutylzirconium, germanium dioxide, antimony trioxide and cobalt acetate are especially preferably used. Two or more of these catalysts can be used in combination.

As the method of adding the catalyst, there can be mentioned a method in which the catalyst is added in advance at the preparation of the aromatic polyester, and a method in which the catalyst is added when the aromatic polyester and the lactone compound are supplied to the extruder.

The amount added of the catalyst is preferably not larger than 0.3% by weight, especially preferably 0.001 polyester and the lactone compound. If the catalyst is added in an amount larger than 0.3% by weight, the ester exchange reaction between the aromatic polyester and the lactone compound is excessively advanced and the mechanical characteristics of the obtained elastic polyester are degraded.

In the process of the present invention for continuously preparing an elastic polyester by reacting the aromatic polyester with the lactone compound in an extruder, a phosphorus compound can be added from the top end portion of the extruder. The phosphorus compound exerts a function of substantially deactivating the ester exchange catalyst present in the reaction system or inhibiting the activity thereof Accordingly, addition of the phosphorus compound is effective if the addition is conducted at the stage where the reaction between the aromatic polyester and the lactone compound is appropriately advanced. If the phosphorus compound is added, there can be attained an effect of inhibiting the reduction of the physical properties of the elastic polyester by the subsequent randomization.

As typical examples of the phosphorus compounds, there can be mentioned inorganic acids such as phosphoric acid, phosphorus acid and hypophosphorous acid, phosphinic acids such as methylphosphinic acid, ethylphosphinic acid, isobutylphosphinic acid, benzylphosphinic acid, phenylphosphinic acid, cyclohexylphosphinic acid and 4-methylphenylphosphinic acid, phosphonic acids such as methylphosphonic acid, ethylphosphonic acid, isopropylphosphonic acid, isobutylphosphonic acid, benzylphosphonic acid, cyclohexylphosphonic acid and 4-methylphenylphosphonic acid, esters of these acids with alkyl, cycloalkyl and aryl having 1 to 20 carbon atoms, such as methyl, ethyl, propyl, cyclohexyl, phenyl and benzyl ester, partial esters thereof, salts of these acids with ammonium and metals such as sodium, potassium, calcium and magnesium, phosphates such as trimethyl phosphate and triphenyl phosphate, and phosphines such as tributylphosphine, triphenylphosphine and tribenzylphosphine.

A high effect is attained if the phosphorus compound is added in an amount such that the number of the phosphorus atom is at least 1 per molecule of the ester exchange catalyst.

Known hindered phenol type, phosphite type, thioether type and amine type antioxidants, benzophenone type and hindered amine type weathering agents, releasing agents such as fluorine-containing polymers, silicone oils, metal stearates, metal montanates, montanic acid ester waxes and polyethylene waxes, coloring agents such as dyes and pigments, ultraviolet absorbers such as titanium oxide and carbon black, reinforcers such as glass fiber, carbon fiber and potassium titanate fiber, fillers such as silica, clay, calcium carbonate, calcium sulfate and glass bead, nucleating agents such as talc, flame retardants, plasticizers, adhesive assistants and tackifiers can be optionally incorporated in the elastic polyester obtained according to the process of the present invention, so far as the attainment of the object of the present invention is not hindered. Moreover, to improve the mechanical strength obtained according to the process of the present invention, other thermoplastic polymer or thermoplastic elastomer can be incorporated. These additives or polymers can be incorporated before the reaction between the aromatic polyester and the lactone compound, or can be incorporated into the elastic polyester after the reaction.

The present invention will now be described in detail with reference to the following examples. In the examples, "%" and "parts" are by weight unless otherwise indicated. The relative viscosity ($\eta r$) is the value measured at 25° C. with respect to a 0.5% by weight polymer solution in o-chlorophenol as the solvent. The surface hardness, melting point and mechanical properties of molded bodies obtained in the examples and comparative examples were determined according to the following methods.

PREPARATION OF MOLDED SAMPLES

By using an injection molding machine having a 5-ounce injection capacity, dumbbell specimens of ASTM No. 1 and Izod impact test pieces were injection-molded at a cylinder temperature of 240° C. and a mold temperature of 80° C. while adjusting the molding cycle to 40 seconds.

SURFACE HARDNESS

The surface hardness was determined according to the method of ASTM D-2240 by using dumbbell specimens of ASTM No. 1 obtained by the above injection molding.

MI VALUE

The MI value was measured at a temperature of 240° C. under a load of 2,160 g according to the method of ASTM D-1238.

MELTING POINT

The melting point was measured at a temperature-elevating rate of 10° C./min by DSC (differential scanning calorimeter).

MECHANICAL PROPERTIES

The tensile test was carried out according to the method of ASTM D-638 by using dumbbell specimens of ASTM No. 1 obtained by the above injection molding. Furthermore, the impact strength was measured according to the method of ASTM D-256 by using Izod impact test pieces.

HYDROLYSIS RESISTANCE

Dumbbell specimens of ASTM No. 1 obtained by the above injection molding were immersed in warm water at 100° C. for 5 days, and then, the specimens were subjected to the tensile test according to the method of ASTM D-638 and the hydrolysis resistance was evaluated based on the retention ratio of the elongation at break, which is defined as the ratio of the elongation at break after the warm water treatment to the elongation at break before the warm water treatement (100%).

REFERENTIAL EXAMPLE

An esterification vessel equipped with a rectifying column and a helical ribbon stirring vane was charged with 100 parts of terephthalic acid, 110 parts of 1,4-butanediol and 0.1 part of tetrabutyl titanate, and esterification reaction was carried out at 220° C. for 2 hours in a nitrogen atmosphere under normal pressure with stirring while causing water formed by the reaction to flow out. The reaction product was transferred into a polymerization vessel and polymerization reaction was carried out at 250° C. under 0.5 Torr for 2 hours. The reaction product was extruded into water in the form of strands, and the strands were cut to obtain polybutylene terephthalate (A-1). The relative viscosity ($\eta r$) of the obtained polybutylene terephthalate was 1.47, and the melting point was 225° C.

Solid phase polymerization of this polybutylene terephthalate (A-1) was carried out at 190° C. under 0.5 Torr. By adopting different solid phase polymerization times, there were obtained polybutylene terephthalate (A-2) having a relative viscosity ($\eta r$) of 1.60 and polybutylene terephthalate (A-3) having a relative viscosity ($\eta r$) of 1.77. The melting point of each of polybutylene terephthalates (A-2) and (A-3) was 225° C.

EXAMPLE 1

Figure 1:
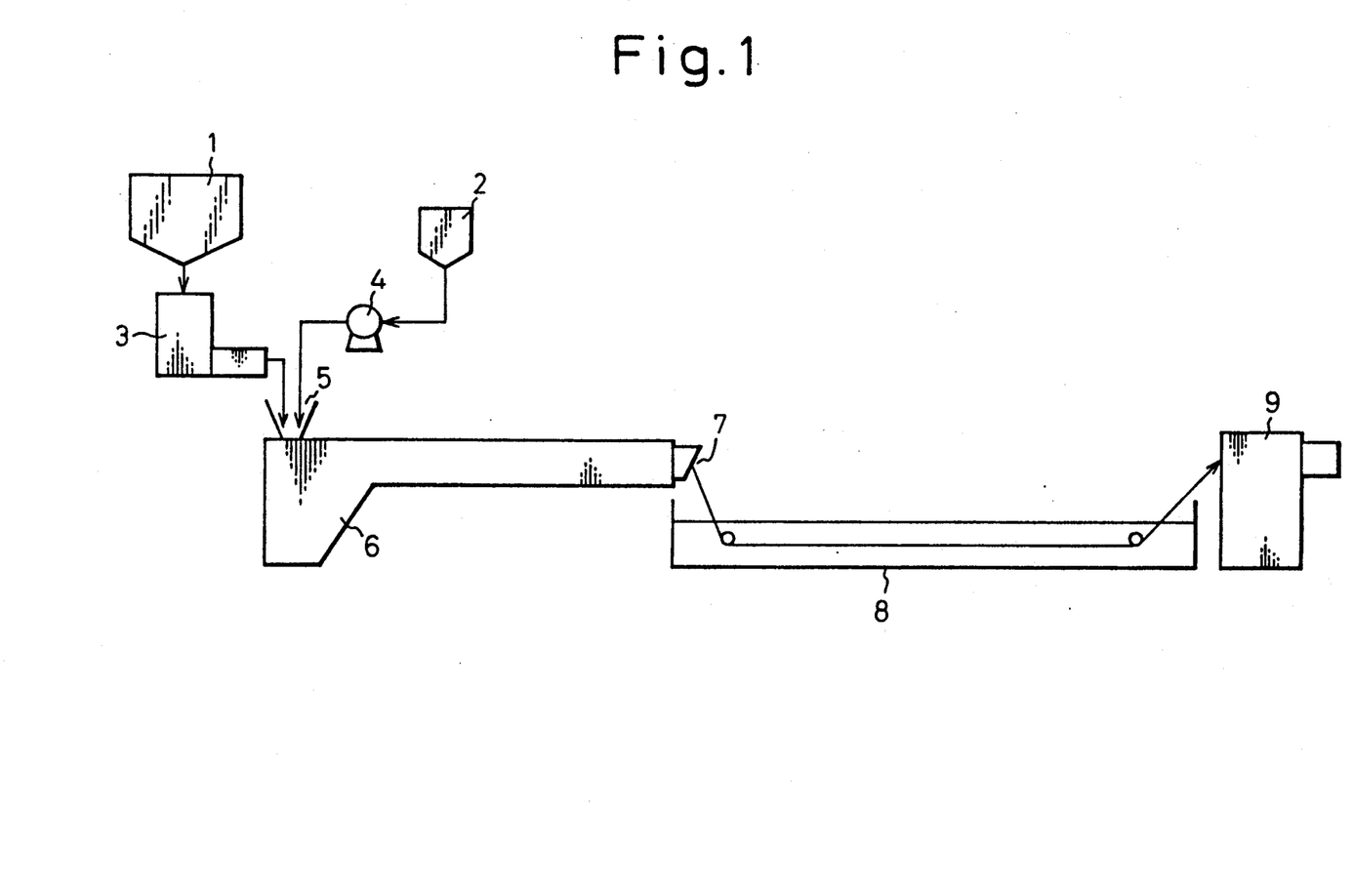
FIG. 1 is a flow chart illustrating one embodiment of the present invention.
Figure 2:
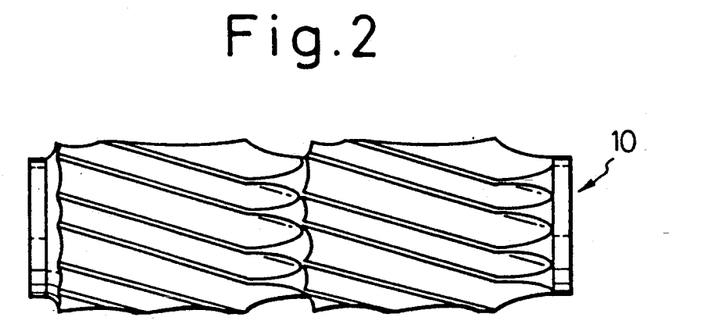
FIG. 2 is a side view illustrating a part of a screw kneading unit of a single-screw extruder.

According to the flow shown in FIG. 1, by using a metering feeder 3, pellets of polybutylene terephthalate (A-2) having a relative viscosity ($\eta r$) of 1.60 were fed at a rate of 1,400 g/hr to a supply opening of a single-screw extruder 6 provided with a screw having an inner diameter of 30 mm and L/D of 40 and having kneading units 10 having a length of 200 mm, as shown in FIG. 2, in the intermediate and top end portions. Furthermore, ξ-caprolactone was fed at a rate of 600 g/hr from a store tank 2 to the supply opening 5 of the single-screw extruder 6 by a metering pump 4.

In this single-screw extruder 6, the occupancy ratio of the space in the volume of the cylinder in the screw-attached state was 45%. The cylinder portion of this single-screw extruder was divided into three parts heated by three heaters. The temperatures were set at 190° C., 230° C. and 240° C. at the parts closer to the supply opening 5 in sequence, and the temperature of the die portion was set at 240° C. and the screw speed was adjusted to 30 rpm and reaction was carried out in this state. Carbon black powder was added from the supply opening 5 and and the average residence time was measured. It was found that the average residence time was 10 minutes. Reaction was conducted under these conditions and the formed polymer was extruded in the form of a strand from an extrusion orifice 7 of the die, and the strand was water-cooled in a cooling water tank 8 and were cut by a cutter 9 to obtain an elastic polyester (B-1).

Polymerization was continuously carried out for 5 hours, and sampling was conducted at an interval of 1 hour. Samples were injection-molded and the surface hardness was measured.

EXAMPLE 2

Figure 3:
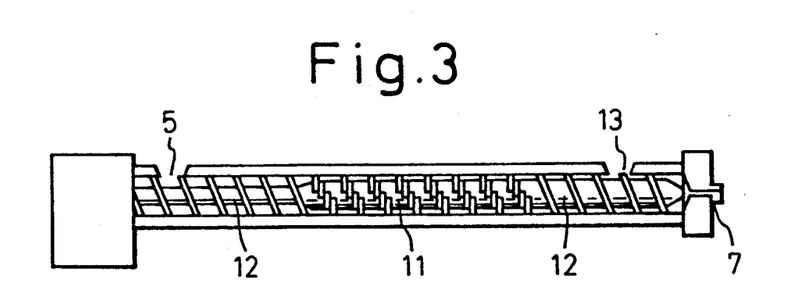
FIG. 3 is a sectional view of a twin-screw extruder used in one embodiment of the present invention.

By using a metering feeder, pellets of polybutylene terephthalate (A-2) having a relative viscosity ($\eta r$) of 1.60 were supplied at a rate of 15 kg/hr to a supply opening 5 of an intermeshing, co-rotating twin-screw extruder (Model TEX44H supplied by Nippon Seikosho) (inner diameter =47 mm, L/D =40) shown in FIG. 3, and ξ-caprolactone was supplied at a rate of 5 kg/hr to the supply opening 5 of TEX44H by a metering pump.

The screw arrangement was such that convex lens-shaped kneading disc paddles were arranged in the intermediate portion (kneading disc zone 11) and the top end portion close to the extrusion orifice, screw type paddles were arranged in other screw zone 12 and the occupancy ratio of the space in the inner volume of the cylinder was 33% in the screw-attached state. The cylinder portion of TEX44H was divided into 12 parts heated by 12 electric heaters, and the temperatures of these parts closer to the supply opening in sequence were set at 190° C., 220° C., 230° C., 230° C., 230° C., 230° C., 230° C., 230° C., 230° C., 230° C., 230° C. and 230° C. and the temperature of the die portion was set at 230° C. Reaction was carried out at a screw speed of 100 rpm while a vent opening 13 was kept closed. Carbon black powder was added from the supply opening 5 and the average residence time was measured. It was found that the average residence time was 7 minutes. Under these conditions, the formed polymer was extruded in the form of a strand from an extrusion orifice 7, and the strand was water-cooled and cut to obtain an elastic polyester (B-2).

Polymerization was continuously carried out for 5 hours and sampling was performed at an interval of 1 hour. The samples were injection-molded and the surface hardness was measured.

EXAMPLE 3

Figure 4:
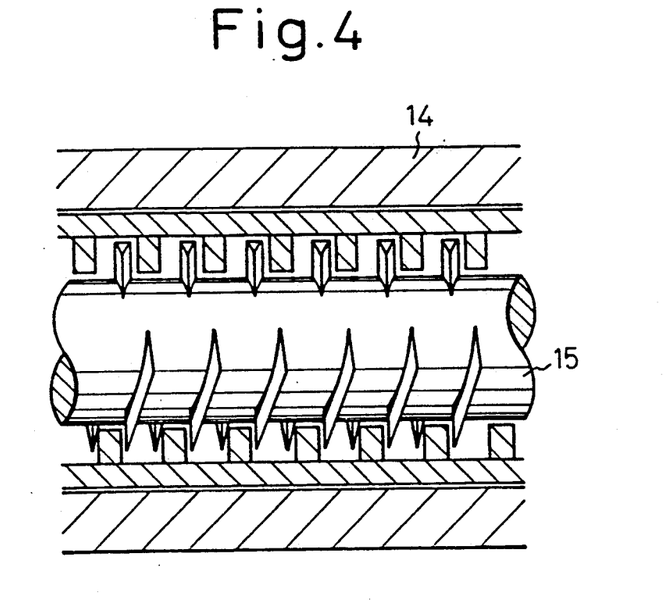
FIG. 4 is a sectional view showing a part of a screw and cylinder of an extruder in one embodiment of the present invention, which has a structure where the screw makes one reciprocating motion in the axial direction while the screw makes one revolution.

By using a metering feeder, pellets of polybutylene terephthalate (A-2) having a relative viscosity ($\eta r$) of 1.60 were fed at a rate of 4 kg/hr to a supply opening of Ko-Kneader PR-46B/GS70B marketed by BUSS, and by using a metering pump, ξ-caprolactone was fed at a rate of 1 kg/hr to the supply opening of Ko-Kneader PR-46B/GS70B. Ko-Kneader PR-46B/GS70B has a structure in which pelletizer GS70B is connected to kneader PR-46B. As shown in FIG. 4, kneader PR-46B comprises a cylinder 14 and a screw 15, and the inner diameter is 46.6 mm and L/D is 15. The occupancy ratio of the space in the inner volume of the cylinder in the screw-attached state is 40%. In pelletizer GS70B, the inner diameter is 70 mm and L/D is 6. Pelletizer GS70B was attached in the T-figured form to kneader PR-46B. The cylinder of kneader PR-46B was divided into 3 parts, which were heated by 3 jackets in which a heating medium was circulated. The temperatures of these parts closer to the supply opening in sequence were set at 210° C., 230° C. and 230° C., and the temperature of the cylinder portion of GS70B was set at 230° C. Reaction was carried out at a screw speed of 100 rpm. Carbon black powder was added from the supply opening whereby the average residence time was measured. It was found that the average residence time was 12 minutes Under these conditions, the formed polymer was extruded in the form of a strand, and the strand was water-cooled and cut to obtain an elastic polyester (B-3).

Polymerization was continuously conducted for 5 hours and sampling was conducted at an interval of 1 hour. Samples were injection-molded, and the surface hardness was measured.

EXAMPLE 4

Figure 5:
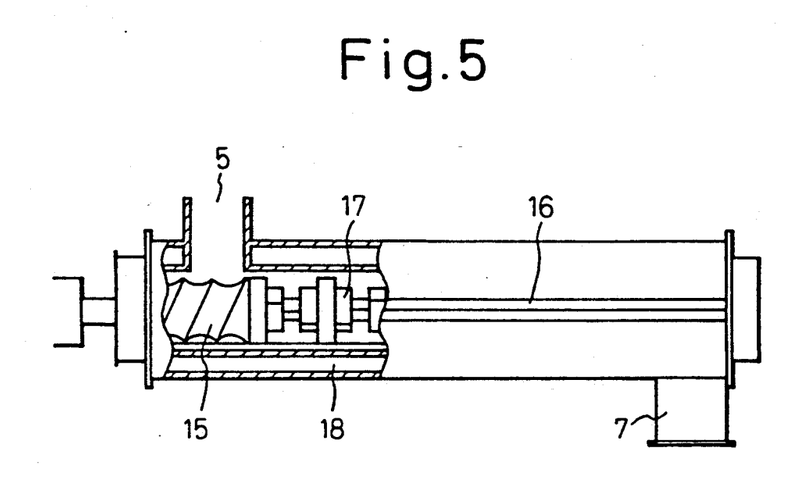
FIG. 5 is a partially cut-out side view showing a self-cleaning type twin-screw extruder used in one embodiment of the present invention.

By using a self-cleaning twin-screw extruder shown in FIG. 5 as the polymerization reactor, pellets of polybutylene terephthalate (A-2) having a relative viscosity ($\eta r$) of 1.60 were fed at a rate of 14 kg/hr to a supply opening 5 by a metering feeder and $\xi$-caprolactone was fed at a rate of 6 kg/hr to the supply opening 5 by a metering pump.

Figure 6A:
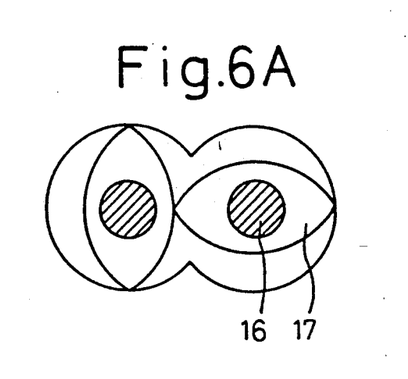
FIGS. 6(A) and 6(B) are sectional views showing typical shapes of the paddle.
Figure 6B:
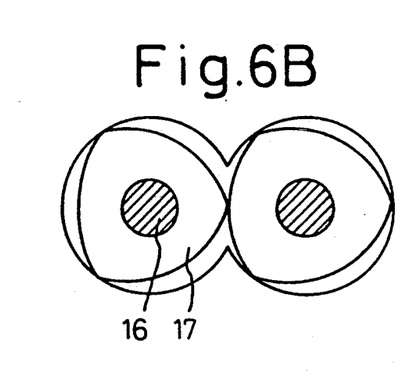

The inner diameter of the reactor was 100 mm and L/D was 15. Paddles 17 having a convex lens-shaped section were mounted on a rotation axis 16 of the reactor, as shown in FIG. 6(A) An ordinary screw was arranged below the supply opening 5 and above the extrusion orifice 7. In the self-cleaning twin-screw extruder, the occupancy ratio of the space in the inner volume of the cylinder in the screw-attached state was 55%.

The rotation axes were rotated in the same direction, and the revolution rate was set at 100 rpm.

The temperature of a heating medium in the jacket of the reactor was set at 230° C. Carbon black powder was added from the supply opening 6 and the average residence time was measured. It was found that the average residence time was 10 minutes. The formed polymer was extruded into water in the form of a strand from the extrusion orifice 7 and was then cut to obtain an elastic polyester (B-4).

EXAMPLES 5 THROUGH 7

Reaction was carried out in the same manner as described in Example 3 except that the feed rate of $\xi$-caprolactone was changed to 500 g/hr or 2 kg/hr, whereby elastic polyester (B-5) and (B-6) were obtained (Examples 5 and 6).

Reaction was carried out under the same conditions as adopted in Example 4 except that the feed rate of $\xi$-caprolatone was changed to 12 kg/hr, whereby an elastic polyester (B-7) was obtained (Example 7).

Polymerization was continuously carried out for 5 hours and sampling was conducted at an interval of 1 hour. Samples were injection-molded and the surface hardness was measured.

COMPARATIVE EXAMPLES 1 AND 2

Figure 7:
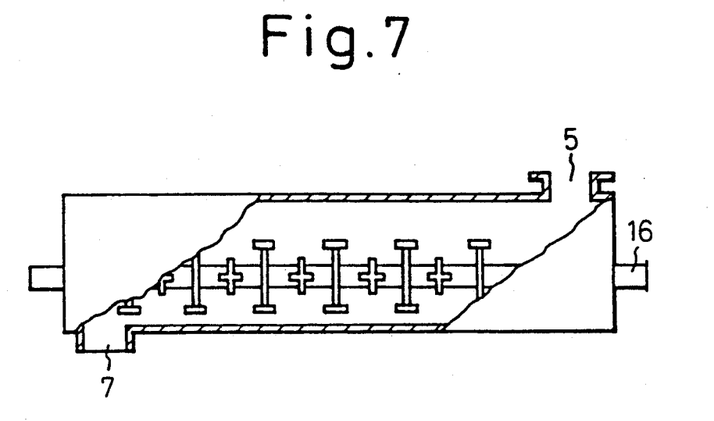
FIG. 7 is a partially cut-out sectional view of a polymerization vessel used for comparison.

By using a metering feeder, pellets of polybutylene terephthalate (A-2) having a relative viscosity ($\eta r$) of 1.60 were supplied at a rate of 14 kg/hr to a supply opening 5 of a continuous polymerization reactor shown in FIG. 7 (inner diameter =80 mm, L/D =20; the occupancy ratio of the space in the inner volume of the polymedriation reactor in the state where a rotation shaft having stirring vanes attached thereto was attached to the polymerization reactor was 80%) and by using a metering pump, $\xi$-caprolactone was fed at a rate of 6 kg/hr to the supply opening 5.

An elastic polyester (B-8) was obtained under conditions such that the revolution rate of the rotation shaft 16 was 5 rpm, the temperature was 230° C. and the residence time was 10 minutes on the average (Comparative Example 1).

Furthermore, an elastic polyester (B-9) was obtained under condition such that the revolution rate of the rotation shaft 16 was 5 rpm, the temperature was 230° C. and the average residence time was 120 minutes (Comparative Example 2).

COMPARATIVE EXAMPLE 3

Figure 8:
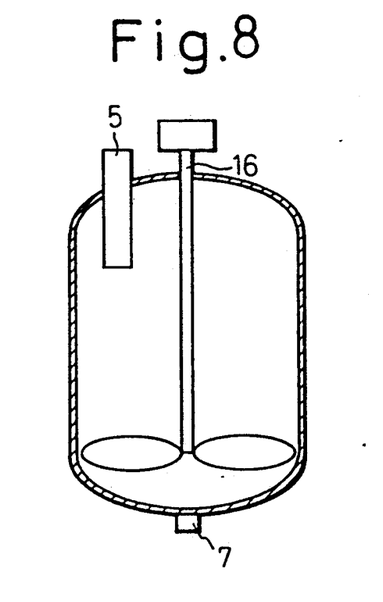
FIG. 8 is a sectional view of a polymerization reactor used for comparison.

An elastic polyester (B-10) was obtained by feeding 14 kg of molten pellets of polybutylene terephthalate (A-2) and 6 kg of $\xi$-caprolactone to a batch type polymerization rector (L/D =1.5; the occupancy ratio of the space in the inner volume of the polymerization reactor in the state where a rotation shaft 16 equipped with stirring vanes was attached was 90%), as shown in FIG. 8, and carrying out polymerization reaction in a nitrogen atmosphere under conditions such that the rotation rate of the rotation shaft 16 was 3 rpm, the temperature was 230° C. and the residence time was 120 minutes.

The physical properties of elastic polyesters B-1 through B-10 obtained in Examples 1 through 7 and Comparative Examples 1 through 3 and dispersions of the surface hardness in the elastic polyesters obtained by continuously conducting the polymerization for 5 hours are shown in Table 1.

Where the occupancy ratio of the space in the inner volume of the polymerization reactor is high as in Comparative Example 1 in Table 1, it is impossible to rotate the stirring shaft at a high rotation rate and the kneading effect is low. Accordingly, if the polymerization time is short, and elastic polyester cannot be obtained. Therefore, to obtain an elastic polyester, it is necessary to adopt a long reaction time as in Comparative Example 2.

Also where a polymerization reactor having a small L/D value is used as in Comparative Example 3, a long reaction time is necessary for obtaining an elastic polyester.

In contrast, according to the preparation process of the present invention, an elastic polyester (B-1 through B-7) having a stable quality can be prepared in a short time.

TABLE 1

| | | Reaction conditions | | Physical Properties of Elastic Polyesters | | | Tensile properties | | | |
|---|---|---|---|---|---|---|---|---|---|---|
| | Elastic polyester | Reaction Temp. (°C.) | Reaction Time (min.) | Relative viscosity | Surface hardness (Shore D) | Melting point (°C.) | Stress at yield (MPa) | Elongation at break (%) | Izod impact Strength (J/m) | Dispersion of surface hardness Shore D |
| Example 1 | B-1 | 230 | 10 | 1.64 | 56 | 207 | 18 | 600 | NB | 56 56 56 57 56 |
| Example 2 | B-2 | 230 | 7 | 1.55 | 60 | 215 | 20 | 540 | NB | 60 60 60 60 60 |
| Example 3 | B-3 | 230 | 12 | 1.60 | 63 | 217 | 21 | 510 | NB | 63 63 63 63 63 |
| Example 4 | B-4 | 230 | 10 | 1.65 | 55 | 207 | 18 | 590 | NB | 55 55 55 55 55 |
| Example 5 | B-5 | 230 | 12 | 1.60 | 76 | 221 | 34 | 310 | 200 | 76 75 76 76 76 |
| Example 6 | B-6 | 230 | 12 | 1.58 | 53 | 204 | 16 | 640 | NB | 53 53 53 53 53 |

TABLE 1-continued

| | Physical Properties of Elastic Polyesters | | | | | | | | |
|---|---|---|---|---|---|---|---|---|---|
| | | Reaction conditions | | | | Tensile properties | | | |
| | Elastic polyester | Reaction Temp. (°C.) | Reaction Time (min.) | Relative viscosity | Surface hardness (Shore D) | Melting point (°C.) | Stress at yield (MPa) | Elongation at break (%) | Izod impact Strength (J/m) | Dispersion of surface hardness Shore D |
| Example 7 | B-7 | 230 | 10 | 1.63 | 40 | 172 | 12 | 1000 | NB | 40 40 39 40 40 |
| Comparative Example 1 | B-8 | 230 | 10 | 1.44 | 80 | 223 | 45 | 290 | 41 | 82 80 80 76 76 |
| Comparative Example 2 | B-9 | 230 | 120 | 1.62 | 55 | 207 | 18 | 590 | NB | 54 56 55 56 55 |
| Comparative Example 3 | B-10 | 230 | 120 | 1.60 | 56 | 206 | 18 | 600 | NB | Not measured because of batchwise polymerization |

Note
NB: not broken

EXAMPLES 8 THROUGH 11

The reaction was carried out in the same manner as described in Example 1 except that polyethylene terephthalate (A-1) having a relative viscosity ($\eta r$) of 1.47 and polybutylene terephthalate (A-3) having a relative viscosity ($\eta r$) of 1.77 were used instead of polybutylene terephthalate (A-2) having a relative viscosity ($\eta r$) of 1.60, whereby elastic polyesters (B-11 and B-12) were obtained, respectively (Examples 8 and 9).

The reaction was carried out in the same manner as described in Example 2 except that polybutylene terephthalate (A-1) having a relative viscosity ($\eta r$) of 1.47 and polybutylene terephthalate (A-3) having a relative viscosity ($\eta r$) of 1.77 were used instead of polybutylene terephthalate (A-2) having a relative viscosity ($\eta r$) of 1.60, whereby elastic polyesters (B-13 and B-14) were obtained, respectively (Examples 10 and 11).

The physical properties of the obtained elastic polyesters are shown in Table 2.

These products have excellent physical properties as elastic polyesters. When polybutylene terephthalate having a high relative viscosity, that is, a high polymerization degree, is used as the a starting material, an elastic polyester having especially excellent mechanical properties can be obtained.

EXAMPLES 12, 13 and 14

The reaction was carried out in the same manner as described in Example 4 except that a mixture formed by mixing ξ-caprolactone with hydrogenated diglycidyl isophthalate (Epikote 191P supplied by Yuka-Shell Epoxy) in an amount of 0.2 part per 100 parts of the sum of polybutylene terephthalate (A-2) having a relative viscosity ($\eta r$) of 1.60 an dξ-caprolactone was fed at a rate of 6 kg/hr, whereby an elastic poolyester (B-15) was obtained (Example 12).

The reaction was carried out in the same manner as described in Example 4 except that a mixture formed by mixing ξ-caprolactone with a diglycidyl ether of bisphenol A (Epikote 828 supplied by Yuka-Shell Epoxy) in an amount of 0.25 part per 100 parts of the sum of polybutylene terephthalate (A-2) having a relative viscosity ($\eta r$) of 1.60 and ξ-caprolactone was fed at a rate of 6 kg/hr, whereby an elastic polyester (B-16) was obtained (Example 13).

The reaction was carried out in the same manner as described in Example 4 except that a mixture formed by mixing ξ-caprolactone with diethylene glycol diglycidyl ether (Denacol 851 supplied by Nagase Kasei Kogyo) in an amount of 2.5 parts per 100 parts of the sum of polybutylene terephthalate (A-2) having a relative viscosity ($\eta r$) of 1.60 and ξ-caprolactone was fed at a rate of 6 kg/hr, whereby an elastic polyester (B-17) was obtained (Example 14).

The physical properties of the obtained elastic polyesters are shown in Table 3.

When the results obtained in Examples 12 and 13 are compared with the results obtained in Example 4, it is seen that by addition of a compound having an epoxy group, the hydrolysis resistance of the elastic polyester is improved and the melt viscosity is increased. However, as shown in Example 14, if an excessive amount of the epoxy compound is added the left unreacted epoxy compound reacts with the elastic polyester, and then the melt viscosity of the elastic polyester increases during the residence in the molten state.

TABLE 2

| | Physical Properties of Elastic Polyesters | | | | | | |
|---|---|---|---|---|---|---|---|
| | | | | | Tensile properties | | |
| | Elastic polyester | Relative viscosity | Surface hardness (Shore D) | Melting point (°C.) | Stress at yield (MPa) | Elongation at break (%) | Izod impact strength (J/m) |
| Example 8 | B-11 | 1.51 | 56 | 207 | 18 | 560 | NB |
| Example 9 | B-12 | 1.85 | 55 | 207 | 17 | 750 | NB |
| Example 10 | B-13 | 1.42 | 60 | 215 | 20 | 510 | NB |
| Example 11 | B-14 | 1.80 | 60 | 215 | 19 | 620 | NB |

Note
NB: not broken

TABLE 3

Physical Properties of Elastic Polyesters

| | Elastic polyester | Surface hardness (Shore D) | Melting point (°C.) | Tensile properties | | Izod impact strength (J/m) | Hydrolysis resistance (100° C. × 5 days) Retention ratio (%) of elongation at break | MI (resident at 240° C.) | |
|---|---|---|---|---|---|---|---|---|---|
| | | | | Stress at yield (MPa) | Elongation at break (%) | | | 0 min. | 30 min. |
| Example 12 | B-15 | 55 | 207 | 18 | 590 | NB | 90 | 18 | 25 |
| Example 13 | B-16 | 55 | 207 | 18 | 600 | NB | 93 | 17 | 30 |
| Example 4 | B-4 | 55 | 207 | 18 | 590 | NB | 10 | 25 | 35 |
| Example 14 | B-17 | 54 | 205 | 18 | 600 | NB | 95 | 17 | 5 |

Note
NB: not broken

EXAMPLES 15 AND 16

The reaction was carried out in the same manner as described in Example 2 except that a composition formed by dry-blending polybutylene terephthalate (A-2) having a relative viscosity ($\eta r$) of 1.60 with monobutyltin oxide in an amount of 0.04 part per 100 parts of the sum of polybutylene terephthalate (A-2) and ξ-caprolactone was fed at a rate of 15 kg/hr to a twin-screw extruder having a vent opening 13 formed on the top end portion thereof as shown in FIG. 3, the residence time was adjusted to 5 minutes, and trimethylphosphate was continuously added from the vent opening 13 by a microfeeder so that the amount of trimethylphosphate was 3 moles per mole of monobutyltin oxide, whereby an elastic polyester (B-18) was obtained (Example 15).

The reaction was carried out in the same manner as described in Example 4 except that a composition formed by dry-blending polybutylene terephthalate (A-2) having a relative viscosity ($\eta r$) of 1.60 with monobutyltin oxide in an amount of 0.03 part per 100 parts of the sum of polybutylene terephthalate (A-2) and ξ-caprolactone was fed at a rate of 14 kg/hr to a self-cleaning twin-screw extruder having a vent opening formed on the top end portion thereof, the residence time was adjusted to 5 minutes, and triphenylphosphate was continuously added from the vent opening by a microfeeder so that the amount of triphenylphosphate was 3 moles per mole of monobutyltin oxide, whereby an elastic polyester (B-19) was obtained (Example 16).

The physical properties of the obtained elastomers are shown in Table 4.

EXAMPLES 17 AND 18

An elastic polyester (B-20) was obtained by carrying out the reaction in the same manner as described in Example 15 except that trimethyl phosphate was not added (Example 17).

An elastic polyester (B-21) was prepared in the same manner as described in Example 16 except that triphenylphosphate was not added (Example 18).

The physical properties of the obtained elastic polyesters are shown in Table 4.

It is seen that by adding monobutyltin oxide, an elastic polyester can be obtained even if the reaction time is shortened.

When Examples 15 and 16 are compared with Examples 17 and 18 with respect to the melting point after 30 minutes' residence at 230° C., it is seen that the catalyst is deactivated by the phosphorus compound and the randomization by the ester exchange reaction is inhibited.

TABLE 4

Physical Properties of Elastic Polyesters

| | Elastic polyester | Reaction conditions | | Relative viscosity | Surface hardness (Shore D) | Tensile properties | | Izod impact strength (J/m) | Melting point (after residence at 230° C.) | |
|---|---|---|---|---|---|---|---|---|---|---|
| | | Temp. (°C.) | Time (min.) | | | Stress at yield (MPa) | Elongation at break (%) | | 0 min. | 30 min. |
| Example 15 | B-18 | 230 | 5 | 1.56 | 60 | 20 | 540 | NB | 216 | 215 |
| Example 16 | B-19 | 230 | 5 | 1.65 | 55 | 18 | 590 | NB | 207 | 207 |
| Example 2 | B-1 | 230 | 7 | 1.55 | 60 | 20 | 540 | NB | 215 | 214 |
| Example 4 | B-3 | 230 | 10 | 1.65 | 55 | 18 | 590 | NB | 207 | 207 |
| Example 17 | B-20 | 230 | 5 | 1.55 | 60 | 20 | 550 | NB | 216 | 199 |
| Example 18 | B-21 | 230 | 5 | 1.65 | 55 | 18 | 590 | NB | 207 | 190 |

Note
NB: not broken

EXAMPLES 19 AND 20

An elastic polyester (B-22) was prepared by carrying out the reaction in the same manner as described in Example 1 except that a vent opening was formed in the top end portion of the single-screw extruder and the removal of unreacted ξ-caprolactone was conducted under a vacuum of 5 Torr (Example 19).

An elastic polyester (B-23) was prepared by carrying out the reaction in the same manner as described in Example 3 except that a vent opening was formed in the top end portion of the PR-46B kneader and the removal of unreacted ξ-caprolactone was conducted under a vacuum of 5 Torr (Example 20).

The obtained elastic polyesters (B-22 and B-23) had no smell and as shown in Table 5, these elastic polyesters had excellent physical properties as well as the elastic polyesters obtained in Examples 1 and 3 (B-1 and B-3).

TABLE 5

| | Elastic polyester | Physical Properties of Elastic Polyesters | | | | Izod impact strength (J/m) |
|---|---|---|---|---|---|---|
| | | Surface hardness (Shore D) | Melting point (°C.) | Tensile properties | | |
| | | | | Stress at yield (MPa) | Elongation at break (%) | |
| Example 19 | B-22 | 55 | 207 | 18 | 600 | NB |
| Example 20 | B-23 | 63 | 217 | 22 | 520 | NB |
| Example 1 | B-1 | 56 | 207 | 18 | 600 | NB |
| Example 3 | B-3 | 63 | 217 | 21 | 510 | NB |

Note
NB: not broken

INDUSTRIAL APPLICABILITY

When an elastic polyester is continuously prepared according to the process of the present invention, the reaction time can be shortened, and an elastic polyester can be easily obtained at a high efficiency by simplified apparatus and operations.

The elastic polyester prepared according to the process of the present invention has an excellent durability represented by heat resistance and weatherability and an excellent rubbery elasticity and mechanical properties. Accordingly, this elastic polyester can be widely used for the production of automobile parts, electric and electronic parts, machine parts and the like.

We claim:

1. A process for the continuous preparation of an elastic polyester, which comprises continuously supplying an aromatic polyester and a lactone compound into an extruder which has (A) a cylinder having a shape of $5 \leq L/D \leq 60$ (where L represents the length of the cylinder and D represents the inner diameter of the cylinder) and (B) at least one screw, and wherein (C) the occupancy ratio (V) of the space in the inner volume of the cylinder in the screw-attached state as defined by the following formula is not larger than 70%:

$$V(\%) = [(Ac - As) \times 100$$

wherein As is a volume of the screw in the cylinder and Ac is an inner volume of the cylinder including the screw volume, and reacting the aromatic polyester with the lactone compound while performing melting, delivery and kneading in the extruder, whereby the reaction of the aromatic polyester with the lactone is completed in the extruder and an elastic polyester is continuously prepared.

2. The process according to claim 1, wherein the extruder is a single-screw extruder having one screw.

3. The process according to claim 1, wherein the extruder in said step of continuously supplying is a twin-screw extruder having two screws.

4. The process according to claim 1, wherein the extruder in said step of continuously supplying includes a screw having a plurality of discontinued ridges which makes one reciprocating motion in the axial direction during one revolution and a cylinder having, on the inner surface thereof, teeth to be engaged with discontinued ridges of the screw.

5. The process according to claim 1, wherein the extruder in said step of continuously supplying includes two screws having a plurality of plate-shaped paddles attached on the rotation axis disposed in parallel to each other, the section of the paddle vertical to the longitudinal direction having a shape selected from a convex lens-like shape, an ellipsoidal shape and a pseudopolygonal shape in which respective vertexes are inscribed with an imaginary circle, and wherein the paddle of one screw is rotated with a slight clearance from the paddle of the other screw and the inner face of the cylinder.

6. The process according to claim 1, wherein the extruder in said step of continuously supplying is an extruder in which the occupancy ratio of the space in the inner volume of the cylinder in the screw-attached state is 5 to 50%.

7. The process according to claim 1, wherein the cylinder temperature of the extruder in said step of melting is in the range of from 210° to 300° C.

8. The process according to claim 1, wherein the cylinder temperature of the extruder while performing melting is in the range of from 215° to 250° C.

9. The process according to claim 1, wherein the time of from the point of the supply of the aromatic polyester and lactone compound to the extruder to the point of the extrusion of the elastic polyester is 30 seconds to 30 minutes.

10. The process according to claim 1, wherein the time from the point of the supply of the aromatic polyester and lactone compound to the extruder to the point of the extrusion of the elastic polyester is 3 to 20 minutes.

11. The process according to claim 1, further including the step of continuously removing the unreacted lactone compound from the elastic polyester obtained by the reaction between the aromatic polyester and lactone compound.

12. The process according to claim 11, further providing a vent opening in the top end portion of the extruder and continuously removing the unreacted lactone compound from the elastic polyester under a vacuum of not larger than 50 Torr.

13. The process according to claim 1, wherein the relative viscosity ($\eta r$) of the aromatic polyester is 1.20 to 2.00 as measured at 25° C. with respect to a 0.5% by weight solution of the polymer in o-chlorophenol as the solvent.

14. The process according to claim 1, wherein the relative viscosity ($\eta r$) of the aromatic polyester is 1.30 to 1.80 as measured at 25° C. with respect to a 0.5% by weight solution of the polymer in o-chlorophenol as the solvent.

15. The process according to claim 1, wherein the aromatic polyester is polybutylene terephthalate.

16. The process according to claim 1, wherein the lactone compound is $\xi$-caprolactone.

17. The process according to claim 1, wherein the aromatic polyester and lactone compound are fed, in said step of continuously supplying, at an aromatic polyester/lactone compound weight ratio of from 99/1 to 20/80.

18. The process according to claim 1, wherein the aromatic polyester and lactone compound are fed, in said step of continuously supplying, at an aromatic polyester/lactone compound weight ratio of from 98/2 to 30/70.

19. The process according to claim 1, further supplying at least one member selected from the group consisting of compounds having at least one epoxy group in the molecule to the extruder together with the aromatic polyester and lactone compound in an amount of 0.01 to 0.27% by weight based on the sum of the aromatic polyester compound and lactone compound.

20. The process according to claim 1, further including the step of supplying at least one member selected from the group consisting of compounds having at least one epoxy group in the molecule to the extruder together with the aromatic polyester and lactone compound in an amount of 0.10 to 0.25% by weight based on the sum of the aromatic polyester compound and lactone compound.

21. The process according to claim 1, further including the step of supplying an ester exchange catalyst to the extruder together with the aromatic polyester and lactone compound, and continuously adding a phosphorus compound to the obtained elastic polyester from the top end portion of the extruder.

22. The process according to claim 21, wherein the amount added of the ester exchange catalyst is 0.001 to 0.3% by weight based on the sum of the aromatic polyester and lactone compound.

23. The process according to claim 21, wherein the amount added of the phosphorus compound is such that at least one phosphorus atom is contained per molecule of the ester exchange catalyst.

* * * * *